United States Patent
Okada et al.

(10) Patent No.: US 7,283,679 B2
(45) Date of Patent: Oct. 16, 2007

(54) IMAGE PROCESSOR AND METHOD THEREOF

(75) Inventors: Ryuzo Okada, Kanagawa (JP); Hiroshi Miyazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 950 days.

(21) Appl. No.: 10/458,265

(22) Filed: Jun. 11, 2003

(65) Prior Publication Data

US 2004/0032990 A1 Feb. 19, 2004

(30) Foreign Application Priority Data

Jun. 12, 2002 (JP) ............................. 2002-171937

(51) Int. Cl.
*G06K 9/40* (2006.01)
(52) U.S. Cl. ..................... 382/260; 358/3.26; 382/288; 382/274; 382/299; 382/300; 348/222
(58) Field of Classification Search ............... 358/3.26; 382/288, 260, 274, 299, 300; 348/222
See application file for complete search history.

(56) References Cited

U.S. PATENT DOCUMENTS 5,909,244 A * 6/1999 Waxman et al. ......... 348/222.1
7,009,636 B2 * 3/2006 Liu et al. .................. 348/208.1

FOREIGN PATENT DOCUMENTS

| JP | 5-145859 | 6/1993 |
| JP | 5-300436 | 11/1993 |
| JP | 5-336314 | 12/1993 |
| JP | 2001-52159 | 2/2001 |
| JP | 2001-292324 | 10/2001 |
| JP | 2002-64750 | 2/2002 |
| JP | 2002-166802 | 6/2002 |

OTHER PUBLICATIONS

Decision for Rejection issued by the Japanese Patent Office on Feb. 6, 2007, for Japanese Patent Application No. 2002-171937, and English-language translation thereof.
Notice of Reasons for Rejection issued by the Japanese Patent Office on Oct. 31, 2006, for Japanese Patent Application No. 2002-171937, and English-language translation thereof.

* cited by examiner

*Primary Examiner*—King Y. Poon
*Assistant Examiner*—Quang N. Vo
(74) *Attorney, Agent, or Firm*—Finnegan, Henderson, Farabow, Garrett & Dunner, L.L.P.

(57) ABSTRACT

An image-processor for shooting images at a high frame rate in time series maintaining a high sensitivity and a high speed is provided. The image-processor comprises a high-speed image-obtaining unit 1 for arranging the imaging elements in a one-dimensional or two-dimensional manner to obtain images at a high frame rate, a pixel selection unit 2 for selecting pixels constituting the image maintaining a predetermined sampling interval, and a peripheral pixel value addition unit 3 for a adding up pixel values of pixels selected by the pixel selection unit 2 and pixel values of peripheral pixeling. It comprises further a pixel value adjusting unit 4 for adjusting the pixel values of the sample pixels calculated by the peripheral pixel value addition unit 3 so as to be suited as pixel values of the output image, and an image output unit 5 for producing pixel values of sample pixels calculated by the pixel value adjusting unit 4 as an image of one frame.

8 Claims, 6 Drawing Sheets

IMAGE PROCESSOR AND METHOD THEREOF

CROSS REFERENCE TO RELATED APPLICATIONS

This application is based upon and claims the benefit of priority from the prior Japanese Patent Application No. 2002-171937 field on Jun. 12, 2002; the entire contents of which are incorporated herein by reference.

BACKGROUND OF THE INVENTION

1. Field of the Invention

This invention relates to an image processor for image-capturing an image sequence of a high frame rate at a high-sensitivity and a high-speed and to a method thereof.

2. Description of the Related Art

When the images are shot at a high-frame rate, the exposure time becomes so short that a dynamic range of a sufficient level is not obtained by using an ordinary image processor and the SN ratio decreases, too.

To shoot the images maintaining a high sensitivity, there can be chiefly contrived four methods.
1. To lengthen the exposure time.
2. To use bright lenses with a small F number.
3. To improve the sensitivity by contriving the circuit of the photo detector (PD).
4. To increase the exposure area by increasing the areas of the pixels.

Despite the above four methods are employed, however, there still remain the following problems.

With the first method, it is not allowed to lengthen the exposure time when it is attempted to shoot the images at a high-frame rate.

With the second method, the sensitivity can be improved by selecting a lens having a large diameter and a small F-number accompanied, however, by limitation.

With the third method, the sensitivity can be improved by contriving the circuit of the photo detector (PD) as taught in, for example, Japanese Patent Publication (kokai) 5-336314, however, by limitation.

With the fourth method, the sensitivity is improved by increasing the areas of the pixels and by increasing the exposure areas. It is, however, difficult to decrease noise due to dark current.

Japanese Patent Publication (Kokai) 2002-64750 proposes a method of improving sensitivity by adding signals of the neighboring pixels.

However, addition of the signals does not make it possible to obtain images maintaining high SN ratios though it may guarantee a dynamic range.

SUMMARY OF THE INVENTION

It is therefore an object of the present invention to obtain images having higher SN ratios than conventional devices yet maintaining a dynamic range of a sufficient degree even when the images are shot at a high-frame rate.

According to one aspect of the invention, there is provided an image processor which processes the images shot in time series so as to feature a high sensitivity and to reduce noise, comprising:

pixel selection means for selecting a plurality of sample pixels at a predetermined sampling interval out of the pixels in the time series of images;

pixel combining means for calculating the weighted sum of peripheral pixel values with respect to each sample pixel by using weights which comply with a Gaussian function, and for computing the enhanced pixel value of each sample pixel based on the calculated weighted sum of peripheral pixels so as to improve the sensitivity;

pixel value adjusting means for adjusting the enhanced pixel values of the sample pixels to lie within a suitable range of pixel values; and image output means for producing an image constituted by the adjusted pixel values of the sample pixels.

In the image processor, the pixel value adjusting means may adjust the pixel values of the sample pixels to lie within a suitable range by executing a processing of multiplying the enhanced pixel values of the sample pixels by a predetermined constant, by executing a processing of replacing the pixel values by a maximum value when the pixel values are exceeding the predetermined maximum value, or by executing both of these processes.

In the image processor, further, the sampling interval of the sample pixels is narrower than a range of peripheral pixels of which the weighed sum is calculated by the pixel value addition means.

The images of time series may be high-speed images shot at 100 frames/second to 2000 frames/second.

The images of time series may be images of time series around a moving body which is shot by an image obtaining means mounted on the moving body, and the images output from the image output means may be sent to a control unit in the moving body.

According to other aspect of the invention, there is provided a method which processes the time series of images so as to feature a high sensitivity and to reduce noise, comprising the steps of:

selecting a plurality of sample pixels at a predetermined sampling interval out of the pixels in the images in time series;

for calculating the weighted sum of peripheral pixel values with respect to each sample pixel by using weights which comply with a Gaussian function, and for computing the enhanced pixel value of each sample pixel based on the calculated weighted sum of peripheral pixels so as to improve the sensitivity;

adjusting the enhanced pixel values of the sample pixels to lie within a suitable range of pixel values; and producing an image constituted by the adjusted pixel values of the sample pixels.

According to one aspect of the invention, there is provided a program for realizing, by using a computer, a method which processes the time series of images series so as to feature a high sensitivity and to reduce noise, consisting of a pixel selection function for selecting a plurality of sample pixels at a predetermined sampling interval out of the pixels in the time series of images;

a pixel combining means function for calculating the weighted sum of peripheral pixel values with respect to each sample pixel by using weights which comply with a Gaussian function, and for computing the enhanced pixel value of each sample pixel based on the calculated weighted sum of peripheral pixels so as to improve the sensitivity;

a pixel value adjusting function for adjusting the enhanced pixel values of the sample pixels to lie within a suitable range of pixel values; and an image output function for producing an image constituted by the adjusted pixel values of the sample pixels.

pixels in the images captured at a high frame rate may be selected at a predetermined sampling interval, the weighed sum of peripheral pixels are calculated by using a weight which complies with, for example, a one-dimensional or two-dimensional Gaussian function with the sample pixels as centers to thereby improve the light-receiving sensitivity of the pixels and to improve SN ratios compared to those of conventional devices. The enhanced pixel values of the sample pixels may be so adjusted as to be used as suitable brightness values of the output images, and the adjusted pixel values are produced as images.

DETAILED DESCRIPTION OF THE INVENTION

Described below with reference to the drawings is an embodiment of the invention.

Figure 1:
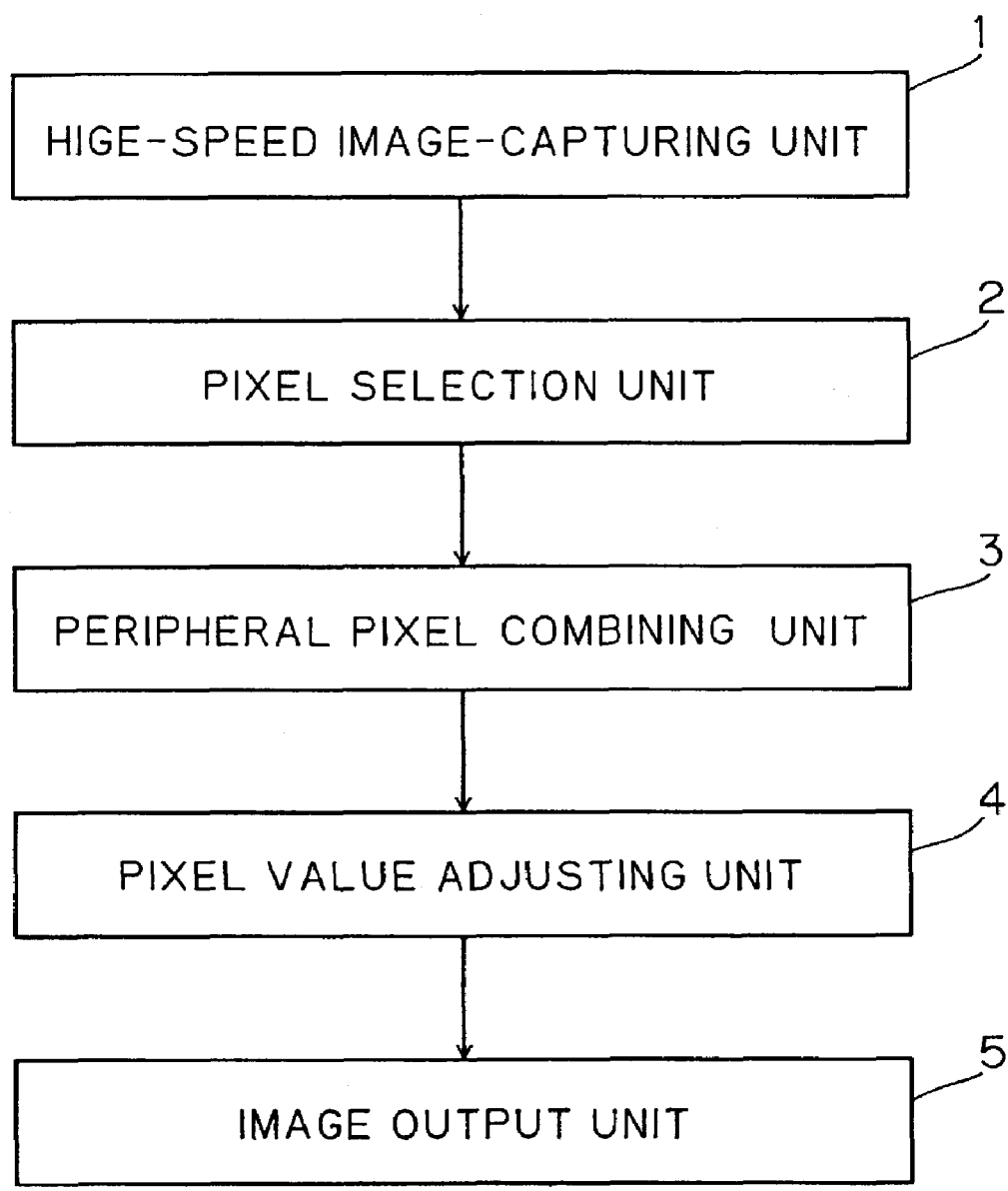
FIG. 1 is a block diagram illustrating the constitution of an embodiment of the invention.

FIG. 1 illustrates a basic constitution of the image-processor 10 of the embodiment of the invention.

(1) Image-processor 10.

(1-1) High-speed Image-capturing Unit 1.

A high-speed image-capturing unit 1 is a device such as a video camera or the like capable of capturing images at a high-frame rate by arranging imaging elements (photo detector) in a one-dimensional or two-dimensional manner. Here, the high-frame rate stands for 100 frames/second to 2000 frames/second.

The imaging elements work as pixels to constitute an image. The following description deals with a case of an area sensor with the two-dimensional arrangement of the imaging elements. The two-dimensional arrangement of pixel values is expressed as I(x, y).

(1-2) Pixel Selection Unit 2.

Figure 2:
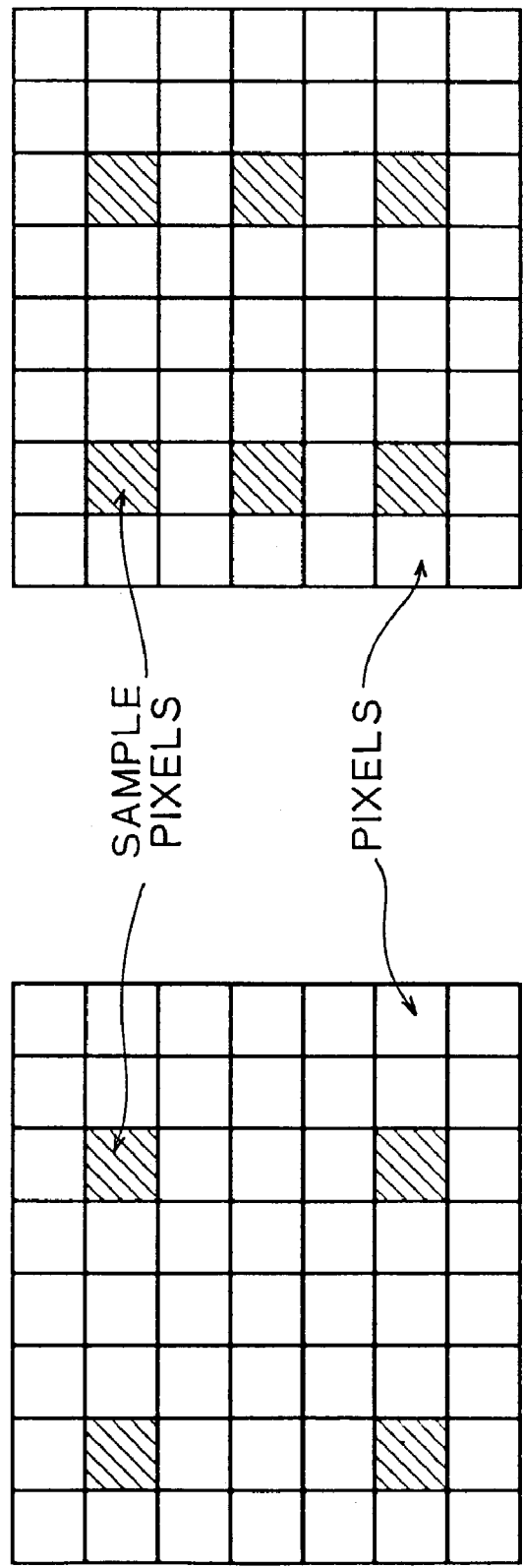
FIG. 2 is a diagram illustrating a method of selecting pixels.

A pixel selection unit 2 selects pixels at a predetermined sampling interval. Hereinafter, the pixels that are selected are referred to as "sample pixels". In the case of the area sensor arranging the imaging elements in the two-dimensional manner, every fourth pixel is selected in the horizontal direction and in the vertical direction, or every fourth pixel is selected in the horizontal direction and every second pixel is selected in the vertical direction (see FIG. 2).

A small sampling interval produces a high-resolution image. When every fourth pixel is selected in both the horizontal and vertical directions in an image of, for example, 1280 pixels by 1024 pixels, the image that is finally produced maintaining a high sensitivity includes 320 pixels by 256 pixels. When the sampling interval is narrowed, the number of pixels approaches to that of the initial input image, and the output image maintains high resolution. In the above example, if every second pixel selected in both the horizontal and vertical directions, the output image consists of 640 pixels by 512 pixels, and the resolution becomes higher than that of the above example.

Further, sampling the pixels makes it possible to reduce the cost of processing for producing high-sensitivity images and, thus, the time series of high-sensitivity images are generated at a rate of 100 frames/second to 2000 frames/second.

(1-3) Peripheral Pixel Combining Unit 3.

A peripheral pixel value addition unit 3 calculates the weighed sum of pixel values of sample pixels selected by the pixel section unit 2 and of pixel values of the peripheral pixels.

Figure 3:
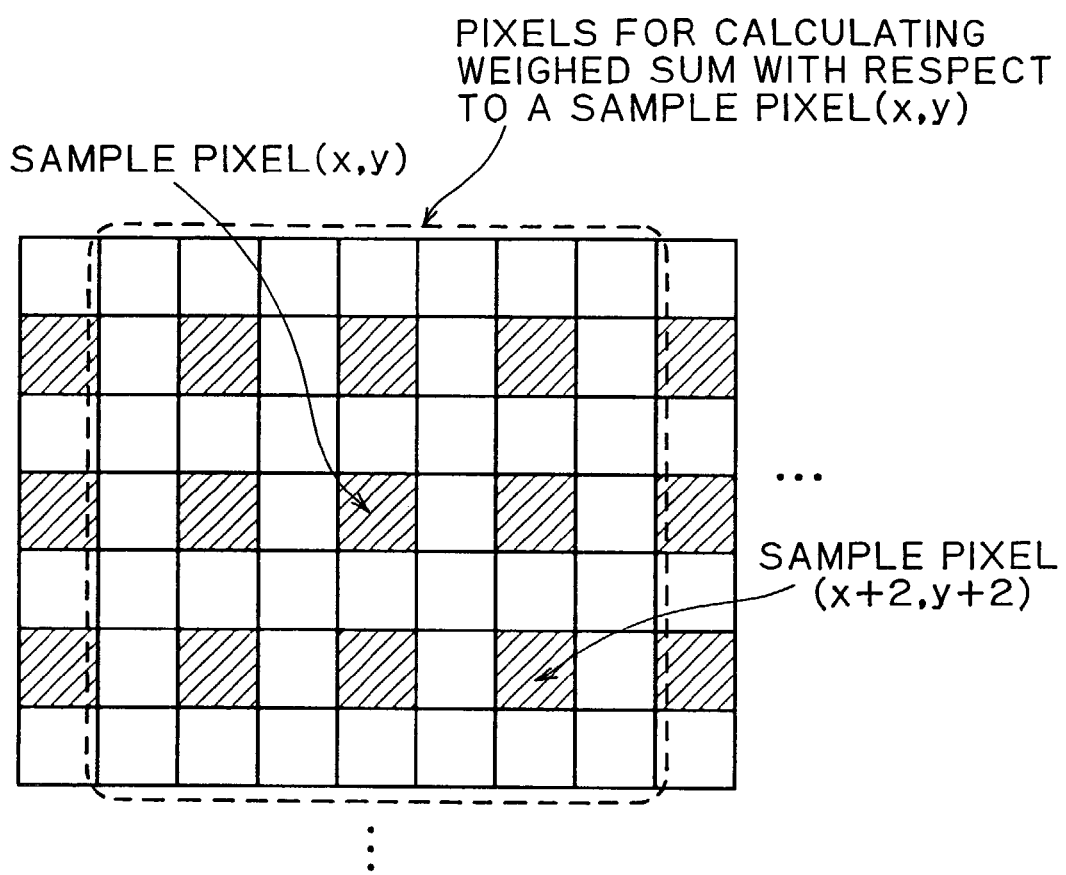
FIG. 3 is a diagram illustrating how to calculate the weighed sum of pixel values of peripheral pixels around the sample pixels.

FIG. 3 is a diagram schematically illustrating a case where every fourth and second pixel is respectively selected in the horizontal and vertical direction by the pixel selection unit 2 to calculate the weighed sum of peripheral pixels (7×7 pixels).

In this case, a enhanced pixel value S(x, y) of a sample pixel (x, y) is calculated by the formula (1), $$S(x, y) = \sum_{i=-3}^{3} \sum_{j=-3}^{3} w(i, j) I(x+i, y+j) \quad (1)$$

where w (i, j) is a weight of a pixel a pixel whose relative position to the sample pixel (x,y) is (i,j).

The weight w(i,j) is determined by quantizing a two-dimensional Gaussian function. The two-dimensional Gaussian function in a continuous system is expressed by the formula (2), $$g(x, y) = M \frac{1}{2\pi\sigma^2} \exp\left(-\frac{x^2 + y^2}{2\sigma^2}\right) \quad (2)$$

where σ is a standard deviation and M is a gain.

When M=1, however, the sensitivity is not improved and, hence, M>1. For example, if the two-dimensional Gaussian function is quantized in the case when M=49 and σ=1, the weighing matrix is expressed by the following formula (3), $$w = \begin{bmatrix} 0.00175052 & 0.0177475 & 0.0707967 & 0.112149 & 0.0707967 & 0.0177475 & 0.00175052 \\ 0.0177475 & 0.179931 & 0.717765 & 1.13701 & 0.717765 & 0.179931 & 0.0177475 \\ 0.0707967 & 0.717765 & 2.86324 & 4.53566 & 2.86324 & 0.717765 & 0.0707967 \\ 0.112149 & 1.13701 & 4.53566 & 7.18494 & 4.53566 & 1.13701 & 0.112149 \\ 0.0707967 & 0.717765 & 2.86324 & 4.53566 & 2.86324 & 0.717765 & 0.0707967 \\ 0.0177475 & 0.179931 & 0.717765 & 1.13701 & 0.717765 & 0.179931 & 0.0177475 \\ 0.00175052 & 0.0177475 & 0.0707967 & 0.112149 & 0.0707967 & 0.0177475 & 0.00175052 \end{bmatrix} \quad (3)$$

Sensitivity of the sample pixel value is improved through the above processing. When the pixel values of the peripheral pixels are all 5, then, 5×M=5×49=245 in this case and the pixel value increases to 245 from 5. If the pixel values in an output image are adjusted to be 8-bit digital values, by a pixel value adjusting unit 4 that will be described later, then, an original image with a low dynamic range shot in a dark scene of, for example, 500 luxes or lower, can be enhanced as the output image with a large dynamic range.

The weights w(i+3, j+3) may be approximated into integers for the convenience of calculation. In the above case, the approximation of the formula (4) is employed. By omitting rows and columns whose elements are all zero when approximated into integers, a matrix of 7×7 in the formula (3) becomes a matrix of 5×5 in the formula (4).

$$S(x, y) = \sum_{i=-2}^{2} \sum_{j=-2}^{2} w(i, j) I(x+i, y+j), w = \begin{bmatrix} 0 & 1 & 1 & 1 & 0 \\ 1 & 3 & 5 & 3 & 1 \\ 1 & 5 & 7 & 5 & 1 \\ 1 & 3 & 5 & 3 & 1 \\ 0 & 1 & 1 & 1 & 0 \end{bmatrix} \quad (4)$$

Compared below are the effects for reducing noise of when the pixel values of the sample pixels are calculated by using the weight that complies with the Gaussian function and of when they are calculated by using a constant weight (same as calculating an average value).

In general, calculating the weighed sum of the peripheries of the sample pixels in the discrete system corresponds to calculating the convolution w (x, y)*f(x, y) of a weighing function w(x, y) and an image function f(x, y) in a continuous system.

For simplicity, the one-dimensional image function f(x) and the weighing function w(x) will now be described.

Figure 4:
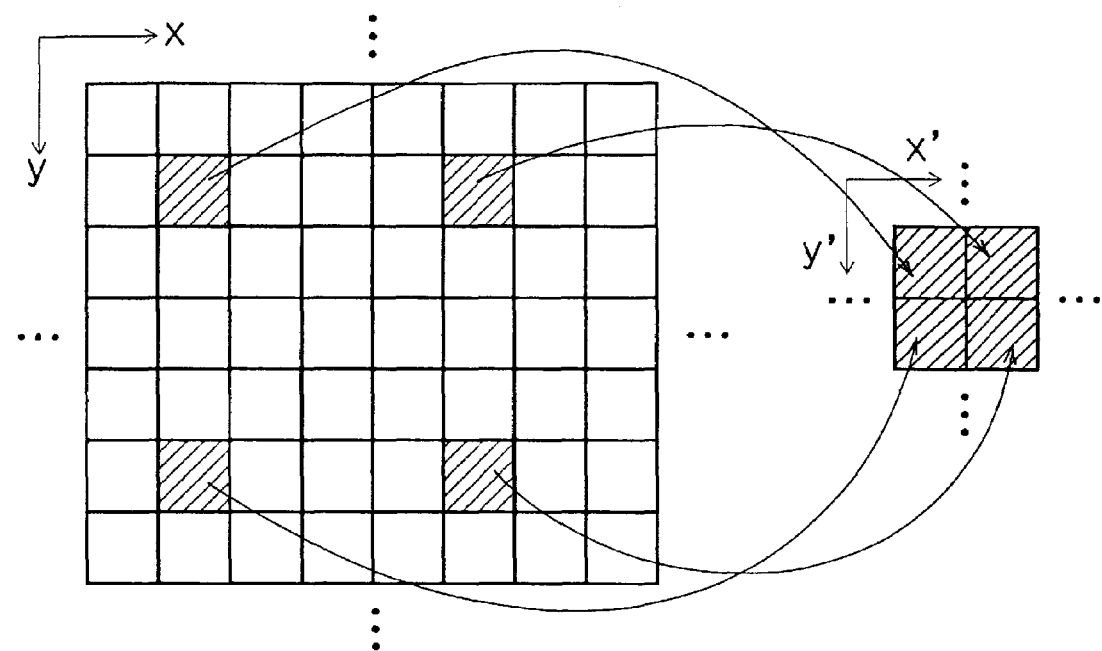
FIG. 4 is a diagram illustrating a method of producing a final output image consisting of the adjusted pixel values of sample pixels.
Figure 5:
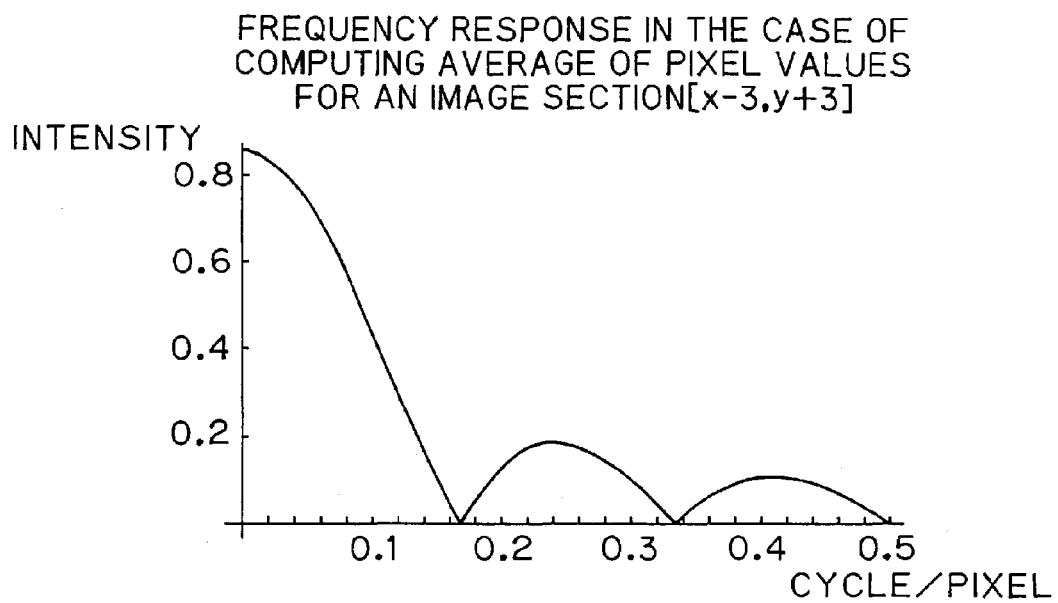
FIG. 5 is a diagram of frequency response when average values are calculated.

It has been known that the Fourier transform of a convolution becomes a product of Fourier transform of the functions. Accordingly, the Fourier transform of w(x)*f(x) becomes W(u)F(u), where W(u) and F(u) are Fourier transforms of w(x) and f(x), respectively, and u is a frequency. The noise component has a high frequency. Therefore, if a response of the weight function for a high frequency is small, then, the noise is filtered out. FIGS. 4 and 5 illustrate a frequency response of a Gaussian function g(x) with σ=1 and a rectangular function r(x) (correspond to calculating an average value) with d=3.

$$g(x) = \frac{1}{\sqrt{2\pi}\,\sigma} \exp\left(-\frac{x^2}{2\sigma^2}\right) \quad (5)$$

$$r(x) = \begin{cases} 1/(2d) & (-d \le x \le d) \\ 0 & (\text{otherwise}) \end{cases} \quad (6)$$

The integrals of responses for high frequencies from 0.4 to 0.5 [cycle/pixel] are 0.00205038 and • function, respectively. Thus, the Gaussian function filters out high frequency components, i.e., nose, better than the rectangular function. The noise can be well removed by increasing d causing, however, the image to be blurred due to the smoothing effect and, hence, deteriorating the image quality.

This invention is advantageous as described below as compared to the conventional system in which a sampling interval used in the pixel selection unit 2 is so determined that a range of the peripheral pixels to beeing combined does not overlap the neighboring sample pixels, and the peripheral pixel values are simply added.

The first advantage is that a resulting image has a higher SN ratio than the one obtained by the conventional system by computing the weighted sum of the peripheral pixel values using the weights complying with the Gaussian function.

The second advantage is that a high-resolution image is obtainable by setting the sampling interval to be narrower than the range of the peripheral pixels being combined. For example, in the case of improving the sensitivity by 16 times in the image with resolution 1280×1024, 16 pixels are added in the conventional system, in which the sampling interval is so determined that the peripheral pixels of a sample pixel do not include those of its adjacent sample pixel. Accordingly, the resolution becomes 320×256. In the system of this invention, on the other hand, a resulting image has higher resolution, 640×512 pixels, than that of the conventional method and still have same amount of sensitivity improvement when sample pixels are selected every second pixel and the weighted sum is calculated using the 16 peripheral pixel values with M=16.

(1-4) Pixel Value Adjusting Unit 4.

The pixel value adjusting unit 4 so adjusts the pixel values of the sample pixel calculated by the peripheral pixel combining unit 3 that the pixels in the output image have suitable pixel values base on the following processing.

1. Multiplies the pixel values by a predetermined constant K.
2. Replaces the pixel values by a maximum value of the output pixels when the pixel values are exceeding the maximum value of the output pixel values.

In the case that the pixel value is adjusted using the above processing both 1 and 2 and the output image has 8-bit pixel value, for example, the pixel value calculated by the peripheral pixel combining unit 3 is first multiplied by K=0.5 and the pixel value which still exceeds 255 is replaced by 255. The gain G of the resulting image is G=M*K.

The procedure for adjusting the pixel value can be differently chosen for each pixel or a procedure can be equally applied to all the pixels in an image.

The constant, K, is a predetermined value that varies depending on the time, and the suitable value of K for a time is experimentally determined beforehand. In the day time, for example, the constant is selected to be low. Since the calculated pixel value often exceeds the maximum pixel value of the output image, the pixel value is replaced by the maximum pixel value of the output image. During the night hours, on the other hand, the constant is set to be high.

The constant, K, can be determined to be a suitable value for an initial image which is shot when the image capturing device 10 is initialized.

(1-5) Image Output Unit 5.

The image output unit 5 produces the image values O (x, y) of the sample pixels calculated by the pixel value adjusting unit 4 as an image of a two-dimensional array.

Figure 6:
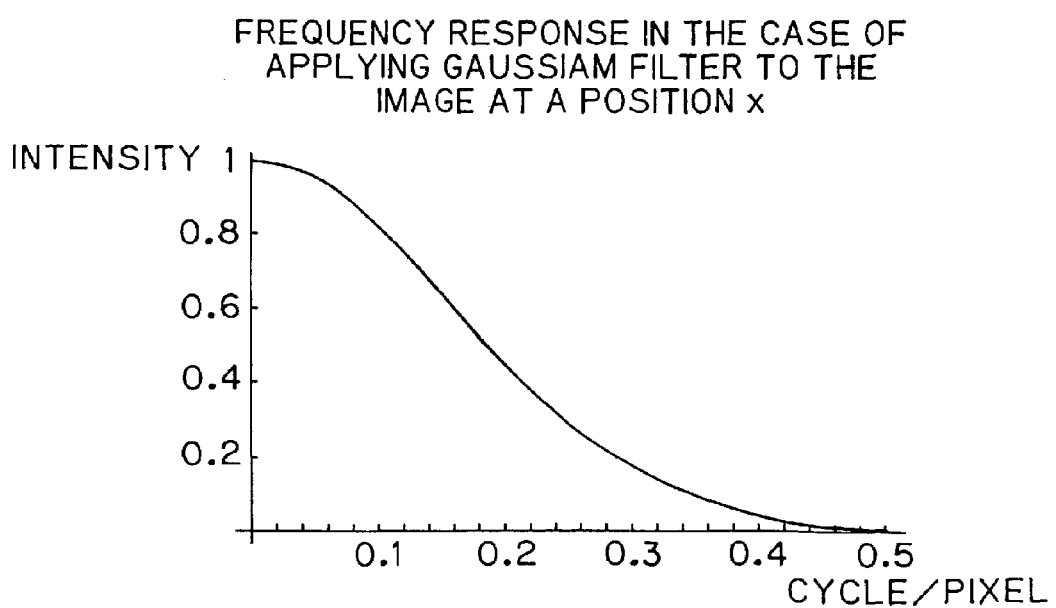
FIG. 6 is a diagram of frequency response when a Gaussian function is convoluted.

When every fourth pixel is selected in both the horizontal direction and the vertical direction as shown in FIG. 6, the image output unit 5 produces an image O (x', y') in which the values of the sample pixels calculated by the pixel value adjusting unit 4 are two-dimensionally rearranged. A relationship between a coordinate (x, y) and a coordinate (x', y') is as shown in FIG. 4; i.e., the sample pixels are selected from the pixels in an original image, whose coordinate is (x, y), shown on the left in FIG. 4, and are rearranged to form the coordinate (x', y') of the sample pixels.

Even when the original image is a color image, the sensitivity is improved by applying the above processing for each of the components that express color. When, for example, the pixels of the color image are expressed by three primary colors (red, green, blue) of light, the weighed sum is calculated by the above procedure for each of the components of red, green and blue.

(1-6) Realizing the Units.

The pixel selection unit 2, peripheral pixel combining unit 3, pixel value adjusting unit 4 and pixel output unit 5 can be realized in a variety of ways, which are not restricted to the above embodiments. For example:

1. The output current or voltage of the photo detector (PD) in the image sensor is added up through an analog circuit.
2. The image sensor is furnished with these logic circuits for executing the procedure stated above.
3. The output of the image sensor is processed by a hardware (FPGA, etc.) executing the procedure stated above.
4. The output of the image sensor is input as image to the computer such as a general-purpose computer and is processed by a program of a software stored in the computer.

(2) Application of the Image-processor 10.

Figure 7:
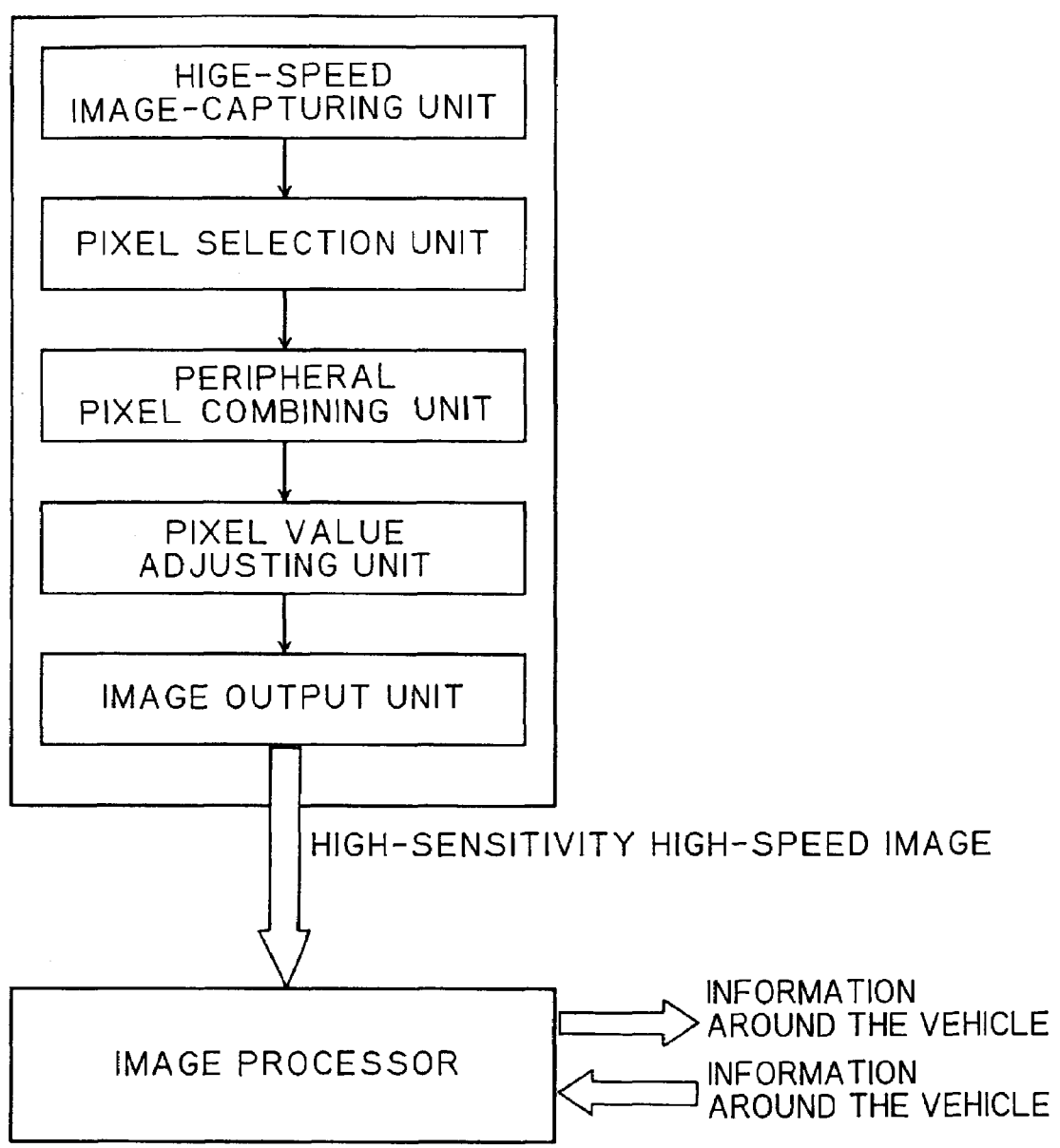
FIG. 7 is a diagram illustrating a use of high-sensitivity images.

FIG. 7 is a diagram illustrating an example of using high-speed and highly sensitive images obtained by the image-processor 10 of the above embodiment.

The information around the moving object such as a vehicle are obtained by using highly sensitive images captured by the image capturing device 10 of the above embodiment.

The high-speed image-capturing unit 1 through up to the image output unit 5 are mounted on the moving object such as a vehicle to obtain a sequence of high-sensitivity images at a high frame rate around the moving object. The images output from the image output unit 5 are input to a control unit including an image processor mounted on the moving object to thereby obtain the information of surroundings of the moving object such as obstacles by image processing.

The information of surroundings may be pedestrians burst out into the road, on-coming cars, preceding vehicles, etc., when the image-capturing device 10 is monitoring the front of the vehicle traveling on a road, and may be vehicles that are overtaking, etc., when the image-capturing device 10 is shooting the rear images.

Use of the high-speed and highly sensitive images makes it possible to obtain the precise data around the vehicle. First, a high-speed shooting of 100 frames/second to 2000 frames/second makes it possible to reliably recognize pedestrians, on-coming cars and preceding vehicles that are moving at high speeds. Further, a high degree of sensitivity makes it possible to reliably recognize the pedestrians, on-coming cars and preceding vehicles not only during the day time but also even at night of as dark as 30 luxes or less provided 100 frames/second is maintained.

In order to obtain the information, further, the image-processor 10 is equipped with a data input/output unit for obtaining vehicle speed, steering angles of the steering wheel and for producing the data obtained through the image processing to the control unit of the vehicle to control the vehicle and to warn the driver.

(3) Modifications.

The above image capturing device 10 has processed the images shot at high speeds, but is further capable of processing even those images shot at an ordinary frame rate of 30 frames/second with a light quantity of less than 10 luxes.

The present invention makes it possible to maintain a sufficient dynamic range even when shooting the images at high speeds and to obtain images having better SN ratios than conventional devices.

What is claimed is:

1. An image processor which processes images shot in time series to improve sensitivity and to reduce noise, the image processor comprising:

pixel selection means for selecting a plurality of sample pixels at a predetermined sampling interval from pixels of the images shot in time series;

pixel combining means for calculating a weighted sum of peripheral pixel values with respect to each sample pixel by using weights compliant with a Gaussian function, and for computing an enhanced pixel value of each sample pixel based on the calculated weighted sum so as to improve the sensitivity;

pixel value adjusting means for adjusting the enhanced pixel values of the sample pixels to a predetermined range of pixel values; and image output means for producing an output image including the adjusted pixel values of the sample pixels;

wherein the pixel value adjusting means adjusts the enhanced pixel values of the sample pixels to the predetermined range either by executing a first process of multiplying the enhanced pixel values of the sample pixels by a predetermined constant, or by executing a second process of replacing the pixel values by a maximum value when the pixel values exceed the maximum value, or by executing both the first and the second process; and wherein the sampling interval of the sample pixels is narrower than a range of the peripheral pixels.

2. An image processor according to claim 1, wherein the images of time series may be high-speed images shot at 100 frames/second to 2000 frames/second.

3. An image processor according to claim 1, wherein the images of time series may be images of time series around a moving body which is shot by an image obtaining means mounted on the moving body, and the images output from the image output means may be sent to a control unit in the moving body.

4. A method which processes a time series of images to improve sensitivity and to reduce noise, the method comprising the steps of:

selecting a plurality of sample pixels at a predetermined sampling interval from pixels of the images in time series;

calculating a weighted sum of peripheral pixel values with respect to each sample pixel by using weights compliant with a Gaussian function, and computing an enhanced pixel value of each sample pixel based on the calculated weighted sum so as to improve the sensitivity;

adjusting the enhanced pixel values of the sample pixels to a predetermined range of pixel values; and producing an output image including the adjusted pixel values of the sample pixels;

wherein the enhanced pixel values of the sample pixels are adjusted to the predetermined range either by executing a first process of multiplying the enhanced pixel values of the sample pixels by a predetermined constant, or by executing a second process of replacing the pixel values by a maximum value when the pixel values exceed the maximum value, or by executing both of the first and the second processes; and wherein the sampling interval of the sample pixels is narrower than a range of the peripheral pixels.

5. A computer readable medium including a program for causing a computer to perform a method for processing a time series of images, the method comprising:
   selecting a plurality of sample pixels at a predetermined sampling interval from pixels of the images in the time series;
   calculating a weighted sum of peripheral pixel values with respect to each sample pixel by using weights compliant with a Gaussian function, and computing an enhanced pixel value of each sample pixel based on the calculated weighted sum so as to improve the sensitivity;
   adjusting the enhanced pixel values of the sample pixels to a predetermined range of pixel values; and
   producing an output image including the adjusted pixel values of the sample pixels;
   wherein the enhanced pixel values of the sample pixels are adjusted to the predetermined range either by executing a first process of multiplying the enhanced pixel values of the sample pixels by a predetermined constant, or by executing a second process of replacing the pixel values by a maximum value when the pixel values exceed the maximum value, or by executing both of the first and the second processes; and
   wherein the sampling interval of the sample pixels is narrower than a range of the peripheral pixels.

6. An image processor, comprising:
   an image obtaining device to obtain images;
   a pixel selection unit configured to select a plurality of sample pixels at a predetermined sampling interval from the pixels of the images;
   a calculating unit configured to calculate a weighted sum of peripheral pixels with the sample pixels as centers by using a weight compliant with a Gaussian function, and configured to compute an enhanced pixel value of each sample pixel based on the calculated weighted sum so as to improve sensitivity;
   an adjusting unit configured to adjust the enhanced pixel values of the sample pixels to a predetermined range of pixel values; and
   an image output device to output an output image having the adjusted pixel values of the sample pixels;
   wherein the adjusting unit adjusts the enhanced pixel values of the sample pixels to the predetermined range either by executing a first process of multiplying the enhanced pixel values of the sample pixels by a predetermined constant, or by executing a second process of replacing the pixel values by a maximum value when the pixel values exceed the maximum value, or by executing both of the first and the second processes; and
   wherein the sampling interval of the sample pixels is narrower than a range of the peripheral pixels.

7. An image processor according to claim 6, wherein
   the images of time series are high-speed images shot at 100 frames/second to 2000 frames/second.

8. An image processor according to claim 6, wherein
   the images of time series may be images of time series around a moving body which is shot by an image obtaining means mounted on the moving body, and the images output from the image output means may be sent to a control unit in the moving body.

* * * * *

UNITED STATES PATENT AND TRADEMARK OFFICE
CERTIFICATE OF CORRECTION

| | |
|---|---|
| PATENT NO. | : 7,283,679 B2 |
| APPLICATION NO. | : 10/458265 |
| DATED | : October 16, 2007 |
| INVENTOR(S) | : Okada et al. |

It is certified that error appears in the above-identified patent and that said Letters Patent is hereby corrected as shown below:

Title page, item (57), line 9, change "for a adding" to --for adding--.

\* Claim 1, column 8, line 32, change "process;" to --processes;--.

Signed and Sealed this

Eighteenth Day of March, 2008

JON W. DUDAS
*Director of the United States Patent and Trademark Office*